(12) United States Patent
Li et al.

(10) Patent No.: US 11,300,211 B2
(45) Date of Patent: Apr. 12, 2022

(54) CAPILLARY MAGNETIC-LIQUID SEALING DEVICE

(71) Applicant: Tsinghua University, Beijing (CN)

(72) Inventors: Decai Li, Beijing (CN); Rui Sun, Beijing (CN); Qian Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/467,855

(22) Filed: Sep. 7, 2021

(65) Prior Publication Data
US 2022/0074499 A1   Mar. 10, 2022

(30) Foreign Application Priority Data

Sep. 8, 2020 (CN) .......................... 202010937085.1

(51) Int. Cl.
*F16J 15/43* (2006.01)
(52) U.S. Cl.
CPC ..................................... *F16J 15/43* (2013.01)
(58) Field of Classification Search
CPC ....................................................... F16J 15/43
See application file for complete search history.

(56) References Cited

U.S. PATENT DOCUMENTS

| | | | | |
|---|---|---|---|---|
| 5,536,088 A * | 7/1996 | Cheever | ................ | F16C 17/107 |
| | | | | 384/107 |
| 5,969,448 A * | 10/1999 | Liu | ................ | F16C 17/105 |
| | | | | 310/67 R |
| 6,679,501 B1 * | 1/2004 | Pelstring | ............... | F16C 33/102 |
| | | | | 277/301 |

FOREIGN PATENT DOCUMENTS

| | | |
|---|---|---|
| CN | 202629081 | 12/2012 |
| CN | 103973021 | 8/2014 |
| CN | 111442093 | 7/2020 |
| JP | H08298747 | 11/1996 |
| JP | 2001153234 A * | 6/2001 |

OTHER PUBLICATIONS

CNIPA, Notification to Grant Patent Right for Invention for CN Application No. 202010937085.1, dated Apr. 26, 2021.
CNIPA, First Office Action for CN Application No. 202010937085.1, dated Mar. 12, 2021.

* cited by examiner

*Primary Examiner* — Vishal A Patel
(74) *Attorney, Agent, or Firm* — Hodgson Russ LLP

(57) ABSTRACT

A capillary magnetic-liquid sealing device includes: a housing having a shaft chamber; a rotating shaft arranged in the shaft chamber; a first pole shoe and a second pole shoe fitted over the rotating shaft and spaced apart in an axial direction of the rotating shaft; a permanent magnet fitted over the rotating shaft and located between the first pole shoe and the second pole shoe; a first magnetically nonconductive capillary block and a second magnetically nonconductive capillary block fitted over the rotating shaft and spaced apart in the axial direction of the rotating shaft. A first capillary cavity is formed among the first magnetically nonconductive capillary block, the first pole shoe and the rotating shaft; and a second capillary cavity is formed among the second magnetically nonconductive capillary block, the second pole shoe and the rotating shaft.

9 Claims, 2 Drawing Sheets

CAPILLARY MAGNETIC-LIQUID SEALING DEVICE

CROSS-REFERENCE TO RELATED APPLICATIONS

This application is based on and claims priority to Chinese Application No. 202010937085.1, filed on Sep. 8, 2020, the entire contents of which is incorporated herein by reference.

FIELD

This application relates to the field of liquid sealing technologies and, more particularly, to a capillary magnetic-liquid sealing device.

BACKGROUND

In a magnetic liquid seal, magnetic liquid is restrained in a sealing gap by a magnetic field to form a liquid O-shaped ring for sealing, and the magnetic liquid seal has advantages of zero leakage, a high reliability, a high pressure resistance, or the like. However, when a rotating shaft has a too high rotational speed, the magnetic liquid in the sealing gap may be swung away due to a centrifugal force, thus seriously influencing the pressure resistance of the magnetic liquid seal, and restricting a development and an application of the magnetic liquid seal in a high-speed occasion.

In a related art, a centrifugal seal is combined with the magnetic liquid seal, such that when the magnetic liquid is swung out of the sealing gap, a certain sealing effect may be continuously kept using the centrifugal seal, so as to prevent a leakage. However, this method is unable to avoid the magnetic liquid being swung out of the gap, and may only serve as an auxiliary sealing method to prevent the leakage due to the magnetic liquid being swung out of the gap, and meanwhile, in the related art, due to absence of a region for storing the magnetic liquid, after swung out of the gap, the magnetic liquid is unable to flow back or be supplemented, which seriously affects the pressure resistance of the magnetic liquid seal.

SUMMARY

A capillary magnetic-liquid sealing device according to an embodiment of the present disclosure includes: a housing having a shaft chamber; a rotating shaft rotatably arranged in the shaft chamber; a first pole shoe and a second pole shoe fitted over the rotating shaft and spaced apart from each other in an axial direction of the rotating shaft, a first sealing gap being formed between the first pole shoe and the rotating shaft in a radial direction of the rotating shaft, and a second sealing gap being formed between the second pole shoe and the rotating shaft in the radial direction of the rotating shaft; a permanent magnet fitted over the rotating shaft and located between the first pole shoe and the second pole shoe; and a first magnetically nonconductive capillary block and a second magnetically nonconductive capillary block fitted over the rotating shaft and spaced apart from each other in the axial direction of the rotating shaft, the first pole shoe and the second pole shoe being both located between the first magnetically nonconductive capillary block and the second magnetically nonconductive capillary block. A first capillary cavity is formed among the first magnetically nonconductive capillary block, the first pole shoe and the rotating shaft, and a second capillary cavity is formed among the second magnetically nonconductive capillary block, the second pole shoe and the rotating shaft. The first magnetically nonconductive capillary block includes a first base ring and a first protruding ring; the first protruding ring includes a first end surface and a second end surface oppositely arranged in the axial direction of the rotating shaft; the second end surface of the first protruding ring is closer to the first pole shoe than the first end surface of the first protruding ring; the first pole shoe includes a first end surface and a second end surface oppositely arranged in the axial direction of the rotating shaft; the first end surface of the first pole shoe is closer to the first magnetically nonconductive capillary block than the second end surface of the first pole shoe; and a distance between the second end surface of the first protruding ring and the first end surface of the first pole shoe in the axial direction of the rotating shaft gradually decreases from outside to inside in the radial direction of the rotating shaft. The second magnetically nonconductive capillary block includes a second base ring and a second protruding ring; the second protruding ring includes a first end surface and a second end surface oppositely arranged in the axial direction of the rotating shaft; the second end surface of the second protruding ring is closer to the second pole shoe than the first end surface of the second protruding ring; the second pole shoe includes a first end surface and a second end surface oppositely arranged in the axial direction of the rotating shaft; the second end surface of the second pole shoe is closer to the second magnetically nonconductive capillary block than the first end surface of the second pole shoe; and a distance between the second end surface of the second protruding ring and the second end surface of the second pole shoe in the axial direction of the rotating shaft gradually decreases from outside to inside in the radial direction of the rotating shaft.

Figure 1:
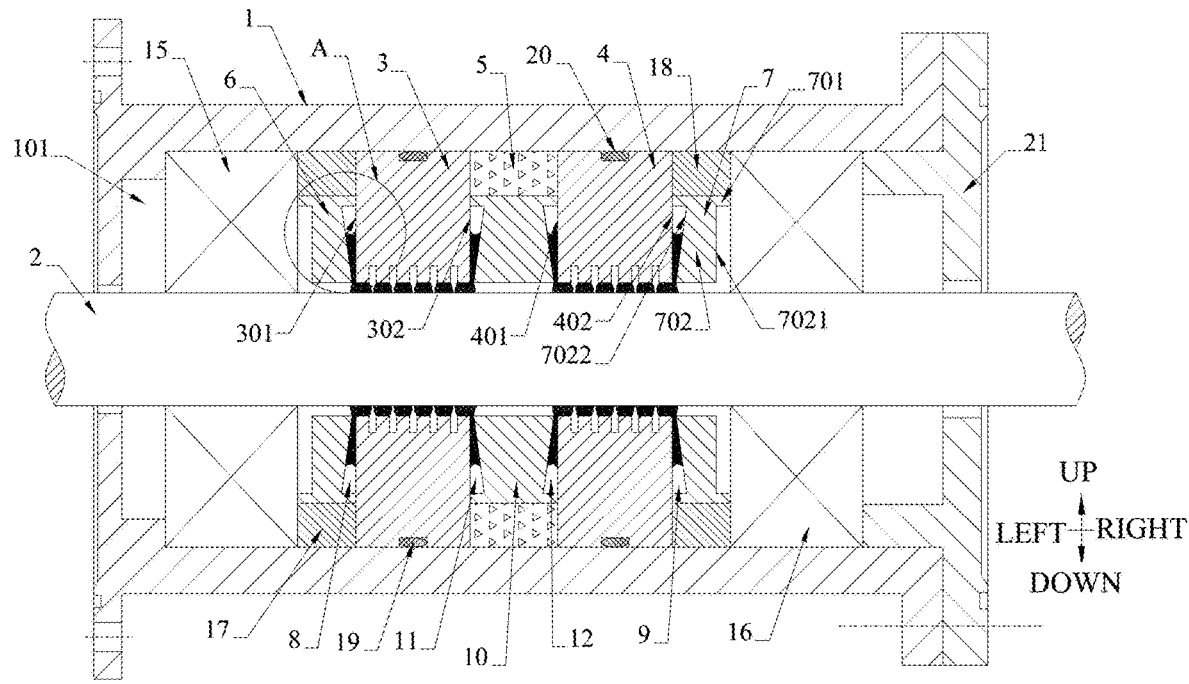
FIG. 1 is a schematic structural diagram of a capillary magnetic-liquid sealing device according to an embodiment of the present disclosure.

REFERENCE NUMERALS housing 1; shaft chamber 101;
rotating shaft 2;
first pole shoe 3; first end surface 301 of first pole shoe; second end surface 302 of first pole shoe;
second pole shoe 4; first end surface 401 of second pole shoe; second end surface 402 of second pole shoe;
permanent magnet 5;
first magnetically nonconductive capillary block 6; first base ring 601; first protruding ring 602; first end surface 6021 of first protruding ring; second end surface 6022 of first protruding ring;
second magnetically nonconductive capillary block 7; second base ring 701; second protruding ring 702; first end surface 7021 of second protruding ring; second end surface 7022 of second protruding ring;

first capillary cavity 8; second capillary cavity 9;

third magnetically nonconductive capillary block 10; third base ring 1001; third protruding ring 1002; first end surface 10021 of third protruding ring; second end surface 10022 of third protruding ring;

third capillary cavity 11; fourth capillary cavity 12;

first auxiliary sealing ring 13; sealing tooth 1301 of first auxiliary sealing ring;

second auxiliary sealing ring 14; sealing tooth 1401 of second auxiliary sealing ring;

first bearing 15; second bearing 16; first magnetic isolation ring 17; second magnetic isolation ring 18; first sealing ring 19; second sealing ring 20; end cover 21;

third auxiliary sealing ring 22; sealing tooth 2201 of third auxiliary sealing ring;

fourth auxiliary sealing ring 23; sealing tooth 2301 of fourth auxiliary sealing ring.

DETAILED DESCRIPTION OF EMBODIMENTS

Reference will be made in detail to embodiments of the present disclosure, and the examples of the embodiments are illustrated in the drawings. The embodiments described herein with reference to drawings are illustrative, and intended for explaining the present disclosure. The embodiments shall not be construed to limit the present disclosure.

As shown in FIGS. 1 to 4, a capillary magnetic-liquid sealing device according to an embodiment of the present disclosure includes a housing 1, a rotating shaft 2, a first pole shoe 3, a second pole shoe 4, a permanent magnet 5, a first magnetically nonconductive capillary block 6, and a second magnetically nonconductive capillary block 7.

The housing 1 has a shaft chamber 101 therein. As shown in FIG. 1, an end cover 21 is provided at a right end of the housing 1, a right end of the rotating shaft 2 penetrates through the end cover 21, the end cover 21 is connected with the housing 1 through a bolt, and the end cover 21 is configured to seal the shaft chamber 101.

The rotating shaft 2 is rotatably provided in the shaft chamber 101.

The first pole shoe 3 and the second pole shoe 4 are fitted over the rotating shaft 2, and arranged at intervals in an axial direction (the left-right direction shown in FIG. 1) of the rotating shaft 2, a first sealing gap is formed between the first pole shoe 3 and the rotating shaft 2 in a radial direction (the up-down direction shown in FIG. 1) of the rotating shaft 2, and a second sealing gap is formed between the second pole shoe 4 and the rotating shaft 2 in the radial direction of the rotating shaft 2. As shown in FIG. 1, a plurality of first pole teeth are arranged at an inner peripheral surface of the first pole shoe 3 at intervals in the left-right direction, inner peripheral surfaces of the plurality of first pole teeth are flush with the inner peripheral surface of the first pole shoe 3, a plurality of second pole teeth are arranged at an inner peripheral surface of the second pole shoe 4 at intervals in the left-right direction, and inner peripheral surfaces of the plurality of second pole teeth are flush with the inner peripheral surface of the second pole shoe 4.

The permanent magnet 5 is fitted over the rotating shaft 2, and located between the first pole shoe 3 and the second pole shoe 4. As shown in FIG. 1, an outer peripheral surface of the permanent magnet 5 contacts an inner wall surface of the housing 1, and an inner peripheral surface of the permanent magnet 5 and an outer peripheral surface of the rotating shaft 2 are arranged at intervals in the radial direction of the rotating shaft 2.

The first magnetically nonconductive capillary block 6 and the second magnetically nonconductive capillary block 7 are fitted over the rotating shaft 2, and arranged at intervals in the axial direction of the rotating shaft 2, the first pole shoe 3 and the second pole shoe 4 are both located between the first magnetically nonconductive capillary block 6 and the second magnetically nonconductive capillary block 7, a first capillary cavity 8 is formed among the first magnetically nonconductive capillary block 6, the first pole shoe 3 and the rotating shaft 2, and configured to collect magnetic liquid swung out of the first sealing gap, and may also store some magnetic liquid in advance, the first sealing gap is in communication with the first capillary cavity 8, and the magnetic liquid in the first capillary cavity 8 enters the first sealing gap to seal a sealing medium. As shown in FIG. 1, a position of the first magnetically nonconductive capillary block 6 at the rotating shaft 2 is located on a left side of the first pole shoe 3, and the first capillary cavity 8 is formed among a right end surface of the first magnetically nonconductive capillary block 6, a left end surface of the first pole shoe 3 and an outer peripheral surface of the rotating shaft 2.

Figure 2:
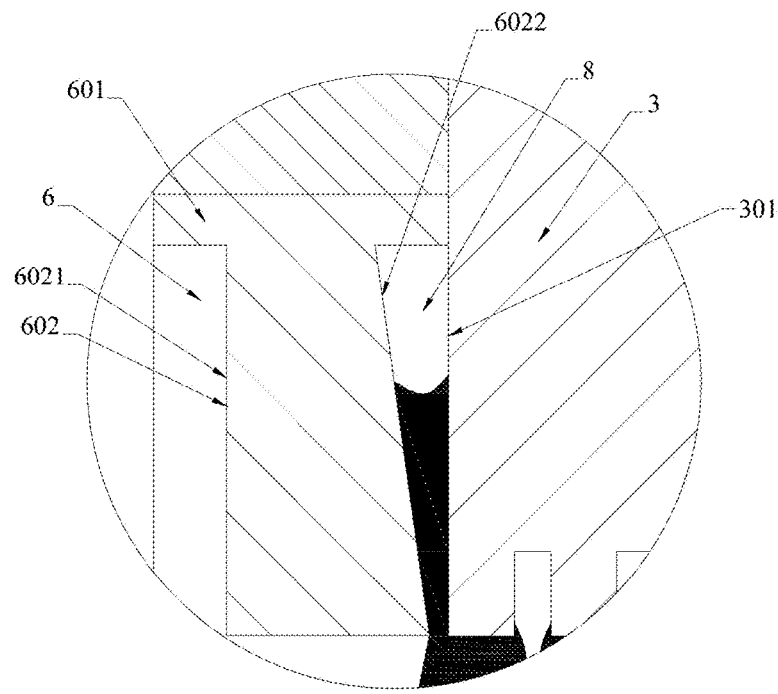
FIG. 2 is a schematic partially enlarged diagram of region A in the capillary magnetic-liquid sealing device shown in FIG. 1.

A second capillary cavity 9 is formed among the second magnetically nonconductive capillary block 7, the second pole shoe 4 and the rotating shaft 2, and configured to collect the magnetic liquid swung out of the first sealing gap, and may also store some magnetic liquid in advance, the second sealing gap is in communication with the second capillary cavity 9, and the magnetic liquid in the second capillary cavity 9 enters the second sealing gap to seal the sealing medium. As shown in FIGS. 1 and 2, a position of the second magnetically nonconductive capillary block 7 at the rotating shaft 2 is located on a right side of the second pole shoe 4, and the second capillary cavity 9 is formed among a left end surface of the second magnetically nonconductive capillary block 7, a right end surface of the second pole shoe 4 and the outer peripheral surface of the rotating shaft 2.

In the capillary magnetic-liquid sealing device according to the embodiment of the present disclosure, the first magnetically nonconductive capillary block is provided on a side of the first pole shoe apart from the second pole shoe, the second magnetically nonconductive capillary block is provided on a side of the second pole shoe apart from the first pole shoe, the first capillary cavity is formed among the first magnetically nonconductive capillary block, the first pole shoe and the rotating shaft, and the second capillary cavity is formed among the second magnetically nonconductive capillary block, the second pole shoe and the rotating shaft; in a mounting process, some magnetic liquid is stored in the first capillary cavity and the second capillary cavity in advance, such that the magnetic liquid is distributed more uniformly in the pole teeth of the pole shoe, and the first magnetically nonconductive capillary block and the second magnetically nonconductive capillary block may control the magnetic liquid in each of different sealing regions, thus reducing loss of a sealing effect of a previous level seal due to inter-level transfer of the magnetic liquid; the magnetic liquid may enter the first capillary cavity and the second capillary cavity after swung out of the first sealing gap and the second sealing gap, thereby reducing a leakage of the magnetic fluid.

In some embodiments, the first magnetically nonconductive capillary block 6 includes a first base ring 601 and a first protruding ring 602 which are integrally formed, the first protruding ring 602 includes a first end surface (the left end surface of the first protruding ring shown in FIG. 1) and a second end surface (the right end surface of the first protruding ring shown in FIG. 1) oppositely arranged in the axial direction of the rotating shaft 2, the second end surface 6022 of the first protruding ring is closer to the first pole shoe 3 than the first end surface 6021 thereof, a first end surface (the left end surface of the first pole shoe shown in FIG. 1) of the first pole shoe is closer to the first magnetically nonconductive capillary block 6 than a second end surface (the right end surface of the first pole shoe shown in FIG. 1) thereof, and a distance between the second end surface 6022 of the first protruding ring and the first end surface 301 of the first pole shoe in the axial direction of the rotating shaft 2 gradually decreases from outside to inside in the radial direction of the rotating shaft 2. As shown in FIG. 1, the distance between the right end surface of the first protruding ring 602 and the left end surface of the first pole shoe 3 in the left-right direction gradually decreases from outside to inside in an up-down direction, and the right end surface of the first protruding ring 602 is configured as an inclined plane which is inclined from outside to inside in the up-down direction.

The second magnetically nonconductive capillary block 7 includes a second base ring 701 and a second protruding ring 702 which are integrally formed, the second protruding ring 702 includes a first end surface (the right end surface of the second protruding ring 702 shown in FIG. 1) and a second end surface (the left end surface of the second protruding ring 702 shown in FIG. 1) oppositely arranged in the axial direction of the rotating shaft 2, the second end surface 7022 of the second protruding ring is closer to the second pole shoe 4 than the first end surface 7021 thereof, the second pole shoe includes a first end surface (the left end surface of the second pole shoe shown in FIG. 1) and a second end surface (the right end surface of the second pole shoe shown in FIG. 1) oppositely arranged in the axial direction of the rotating shaft, the second end surface of the second pole shoe is closer to the second magnetically nonconductive capillary block than the first end surface thereof, a distance between the second end surface 7022 of the second protruding ring and the second end surface 402 of the second pole shoe in the axial direction of the rotating shaft 2 gradually decreases from outside to inside in the radial direction of the rotating shaft 2, and as shown in FIG. 1, the distance between the left end surface of the second protruding ring 702 and the right end surface of the second pole shoe 3 in the left-right direction gradually decreases from outside to inside in the up-down direction, and the left end surface of the second protruding ring 702 is configured as an inclined plane which is inclined from outside to inside in the up-down direction.

In some embodiments, the capillary magnetic-liquid sealing device further includes a third magnetically nonconductive capillary block 10 fitted over the rotating shaft 2, the third magnetically nonconductive capillary block 10 is located between the first pole shoe 3 and the second pole shoe 4, and an outer peripheral surface of the third magnetically nonconductive capillary block 10 is in contact with an inner peripheral surface of the permanent magnet 5; a third capillary cavity 11 is formed among the third magnetically nonconductive capillary block 10, the first pole shoe 3 and the rotating shaft 2, and configured to collect the magnetic liquid swung out of the first sealing gap, and may also store some magnetic liquid in advance, the first sealing gap is in communication with the third capillary cavity 11, and the magnetic liquid in the third capillary cavity 11 enters the first sealing gap to seal the sealing medium. As shown in FIG. 1, the third capillary cavity 11 is formed among a left end surface of the third magnetically nonconductive capillary block 6, the right end surface of the first pole shoe 3 and the outer peripheral surface of the rotating shaft 2.

A fourth capillary cavity 12 is formed among the third magnetically nonconductive capillary block 10, the second pole shoe 4 and the rotating shaft 2, and configured to collect the magnetic liquid swung out of the second sealing gap, and may also store some magnetic liquid in advance, the second sealing gap is in communication with the fourth capillary cavity, and the magnetic liquid in the fourth capillary cavity enters the second sealing gap to seal the sealing medium. As shown in FIG. 1, the fourth capillary cavity 12 is formed among a right end surface of the third magnetically nonconductive capillary block 10, the left end surface of the second pole shoe 4 and the outer peripheral surface of the rotating shaft 2. The first capillary cavity 8, the second capillary cavity 9, the third capillary cavity 11 and the fourth capillary cavity 12 have consistent sizes and shapes.

In some embodiments, the third magnetically nonconductive capillary block 10 includes a third base ring 1001 and a third protruding ring 1002 which are integrally formed, the third protruding ring 1002 includes a first end surface (the left end surface of the third protruding ring shown in FIG. 1) and a second end surface (the right end surface of the third protruding ring shown in FIG. 1) oppositely arranged in the axial direction of the rotating shaft 2, the first end surface 10021 of the third protruding ring is closer to the first pole shoe 3 than the second end surface 10022 thereof, and the second end surface 10022 of the third protruding ring is closer to the second pole shoe 4 than the first end surface 10021 thereof.

A distance between the first end surface 10021 of the third protruding ring and the second end surface 302 of the first pole shoe in the axial direction of the rotating shaft 2 gradually decreases from outside to inside in the radial direction of the rotating shaft 2, and a distance between the second end surface 10022 of the third protruding ring and the first end surface 401 of the second pole shoe in the axial direction of the rotating shaft 2 gradually decreases from outside to inside in the radial direction of the rotating shaft 2. As shown in FIG. 1, the distance between the left end surface of the third protruding ring 1002 and the right end surface of the first pole shoe 3 in the left-right direction gradually decreases from outside to inside in the up-down direction, and the left end surface of the third protruding ring 1002 is configured as an inclined plane which is inclined from outside to inside in the up-down direction; the distance between the right end surface of the third protruding ring 1002 and the left end surface of the second pole shoe 4 in the left-right direction gradually decreases from outside to inside in the up-down direction, and the right end surface of the third protruding ring 1002 is configured as an inclined plane which is inclined from outside to inside in the up-down direction.

A pressure resistance of a magnetic liquid seal may be rewritten as a relationship between magnetic surface tension related to a magnitude of a magnetic field and the sealing gap, and therefore may be greatly improved by reducing the gap of the magnetic liquid seal. As shown in FIGS. 1 and 2, the closer to the rotating shaft 2, the shorter the distance between the right end surface of the first magnetically nonconductive capillary block 6 and the left end surface of the first pole shoe 3 in the left-right direction, and the greater a generated capillary force, such that the magnetic liquid in the first capillary cavity 8 is sucked into the first sealing gap under the action of the capillary force, thus recovering the magnetic liquid, and also avoiding the leakage of the magnetic liquid. The closer to the rotating shaft 2, the shorter the distance between the left end surface of the second magnetically nonconductive capillary block 7 and the right end surface of the second pole shoe 4 in the left-right direction, and the magnetic liquid in the second capillary cavity 9 is sucked into the second sealing gap under the action of a capillary force, thus recovering the magnetic liquid, and also avoiding the leakage of the magnetic liquid.

As shown in FIG. 1, the closer to the rotating shaft 2, the shorter the distance between the left end surface of the third magnetically nonconductive capillary block 10 and the right end surface of the first pole shoe 3 in the left-right direction, and the greater a generated capillary force, such that the magnetic liquid in the third capillary cavity 11 is sucked into the first sealing gap under the action of the capillary force, thus recovering the magnetic liquid, and also avoiding the leakage of the magnetic liquid; the closer to the rotating shaft 2, the shorter the distance between the right end surface of the third magnetically nonconductive capillary block 10 and the left end surface of the second pole shoe 4, and the magnetic liquid in the fourth capillary cavity 12 is sucked into the second sealing gap under the action of a capillary force, thus recovering the magnetic liquid, and also avoiding the leakage of the magnetic liquid.

In some embodiments, the first magnetically nonconductive capillary block 6 and the rotating shaft 2 have a gap less than 0.1 mm in the radial direction of the rotating shaft 2, and the second magnetically nonconductive capillary block 7 and the rotating shaft 2 have a gap less than 0.1 mm in the radial direction of the rotating shaft 2. The less the gap between the first magnetically nonconductive capillary block 6 and the rotating shaft 2 in the up-down direction, the higher the pressure resistance of the magnetic liquid seal, and the less the gap between the second magnetically nonconductive capillary block 7 and the rotating shaft 2 in the up-down direction, the higher the pressure resistance of the magnetic liquid seal.

In some embodiments, the first sealing gap has a size of 0.1 to 0.3 mm in the radial direction of the rotating shaft 2, the second sealing gap has a size of 0.1 to 0.3 mm in the radial direction of the rotating shaft 2, and it may be understood that the sizes of the first sealing gap and the second sealing gap in the radial direction of the rotating shaft 2 are not limited thereto.

In some embodiments, the first magnetically nonconductive capillary block 6 and the rotating shaft 2 have a gap equal to or less than 0.1 mm in the radial direction of the rotating shaft 2, the second magnetically nonconductive capillary block 7 and the rotating shaft 2 have a gap equal to or less than 0.1 mm in the radial direction of the rotating shaft 2, and the third magnetically nonconductive capillary block 10 and the rotating shaft 2 have a gap equal to or less than 0.1 mm in the radial direction of the rotating shaft 2. The less the gaps between the first magnetically nonconductive capillary block 6, the second magnetically nonconductive capillary block 7 and the third magnetically nonconductive capillary block 10 and the rotating shaft 2 in the up-down direction, the higher the pressure resistance of the magnetic liquid seal.

In some embodiments, a minimum distance between the second end surface 6022 of the first protruding ring and the first end surface 301 of the first pole shoe in the axial direction of the rotating shaft 2 is equal to or less than the size of the first sealing gap in the radial direction of the rotating shaft 2, a minimum distance between the second end surface 7022 of the second protruding ring and the second end surface 402 of the second pole shoe in the axial direction of the rotating shaft 2 is equal to or less than the size of the first sealing gap in the radial direction of the rotating shaft 2, a minimum distance between the first end surface 10021 of the third protruding ring and the second end surface 302 of the first pole shoe in the axial direction of the rotating shaft 2 is equal to or less than the size of the first sealing gap in the radial direction of the rotating shaft 2, and a minimum distance between the second end surface 10022 of the third protruding ring and the first end surface 401 of the second pole shoe in the axial direction of the rotating shaft 2 is equal to or less than the size of the first sealing gap in the radial direction of the rotating shaft.

In some embodiments, the capillary magnetic-liquid sealing device further includes a first auxiliary sealing ring 13, a second auxiliary sealing ring 14, a third auxiliary sealing ring 22, and a fourth auxiliary sealing ring 23; the first auxiliary sealing ring 13 is fitted over the rotating shaft 2, fixed between the first magnetically nonconductive capillary block 6 and the rotating shaft 2, and configured to achieve an auxiliary sealing effect on the sealing medium; the second auxiliary sealing ring 14 is fitted over the rotating shaft 2, fixed between the second magnetically nonconductive capillary block 7 and the rotating shaft 2, and configured to prevent the magnetic liquid from leaving the second sealing gap and meanwhile prevent entrance of external dust; the third auxiliary sealing ring 22 is fitted over the rotating shaft 2, and fixed between the third magnetically nonconductive capillary block 10 and the rotating shaft 2, the fourth auxiliary sealing ring 23 is fitted over the rotating shaft 2, and fixed between the third magnetically nonconductive capillary block and the rotating shaft, and the third auxiliary sealing ring 22 and the fourth auxiliary sealing ring 23 are arranged at intervals in the axial direction of the rotating shaft, symmetrically arranged with respect to an axial center line of the third magnetically nonconductive capillary block 10, and configured to prevent inter-level transfer of the magnetic liquid.

Figure 3:
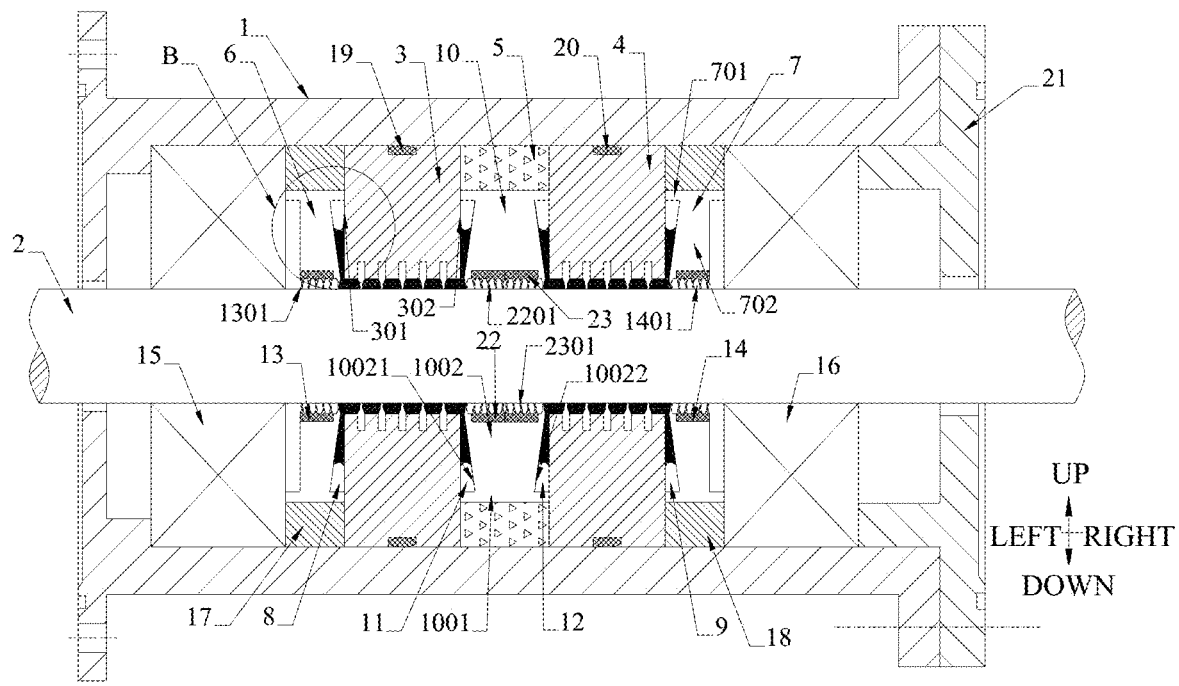
FIG. 3 is a schematic structural diagram of a capillary magnetic-liquid sealing device according to an embodiment of the present disclosure, showing a first auxiliary sealing ring and a second auxiliary sealing ring.
Figure 4:
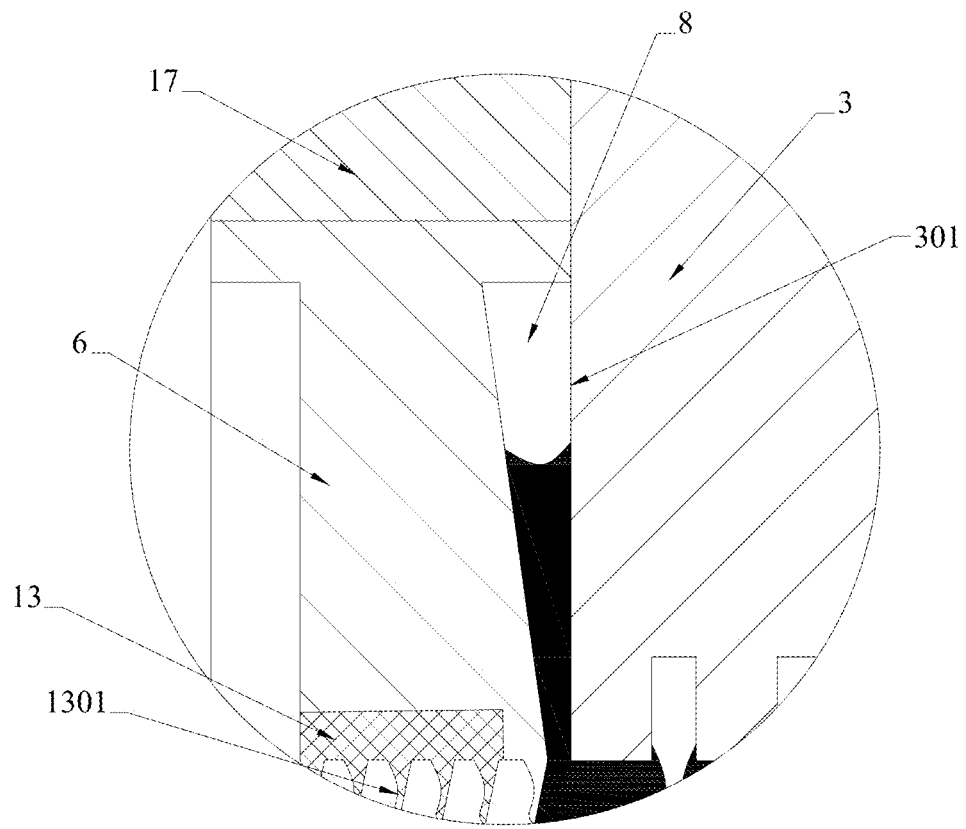
FIG. 4 is a schematic partially enlarged diagram of region B in the capillary magnetic-liquid sealing device shown in FIG. 3.

As shown in FIGS. 3 and 4, a groove is formed at an inner peripheral surface of the first magnetically nonconductive capillary block 6 and extends from left to right, a right wall surface of the groove has a predetermined distance from the right end surface of the first magnetically nonconductive capillary block 6, and the first auxiliary sealing ring 13 is located in the groove in the inner peripheral surface of the first magnetically nonconductive capillary block 6; a groove is formed at an inner peripheral surface of the second magnetically nonconductive capillary block 7 and extends from right to left, a left wall surface of the groove has a predetermined distance from the left end surface of the second magnetically nonconductive capillary block 7, and the second auxiliary sealing ring 14 is located in the groove in the inner peripheral surface of the second magnetically nonconductive capillary block 7.

A groove is formed at an inner peripheral surface of the third magnetically nonconductive capillary block 10 and simultaneously extends leftwards and rightwards from the center line of the third magnetically nonconductive capillary block 10 in the left-right direction, a left wall surface of the groove has a predetermined distance from the left end surface of the third magnetically nonconductive capillary block 10, a right wall surface of the groove has a predetermined distance from the right end surface of the third magnetically nonconductive capillary block 10, and the third auxiliary sealing ring 22 and the fourth auxiliary sealing ring 23 are both located in the groove in the inner peripheral surface of the third magnetically nonconductive capillary block 10, arranged in this groove in the left-right direction, and symmetrically arranged in the left-right direction with respect to the center line of the third magnetically nonconductive capillary block 10 in the left-right direction.

In some embodiments, an inner peripheral surface of the first auxiliary sealing ring 13 has a plurality of sealing teeth 1301 arranged at intervals in the axial direction of the rotating shaft 2, an inner peripheral surface of the second auxiliary sealing ring 14 has a plurality of sealing teeth 1401 arranged at intervals in the axial direction of the rotating shaft 2, an inner peripheral surface of the third auxiliary sealing ring 22 has a plurality of sealing teeth 2201 arranged at intervals in the axial direction of the rotating shaft 2, and an inner peripheral surface of the fourth auxiliary sealing ring 23 has a plurality of sealing teeth 2301 arranged at intervals in the axial direction of the rotating shaft 2. By arranging the plurality of sealing teeth, a multilevel sealing effect may be achieved on the magnetic liquid, thus further reducing the leakage of the magnetic liquid.

In some embodiments, the first auxiliary sealing ring 13 and the rotating shaft 2 have a gap less than 0.1 mm in the radial direction of the rotating shaft 2, and the second auxiliary sealing ring 14 and the rotating shaft 2 have a gap less than 0.1 mm in the radial direction of the rotating shaft 2. The third auxiliary sealing ring 22 and the rotating shaft 2 have a gap less than 0.1 mm in the radial direction of the rotating shaft 2, and the fourth auxiliary sealing ring 23 and the rotating shaft 2 have a gap less than 0.1 mm in the radial direction of the rotating shaft 2; the less the gap between the first auxiliary sealing ring 13 and the rotating shaft 2 in the up-down direction, the higher the pressure resistance of the magnetic liquid seal, the less the gap between the second auxiliary sealing ring 14 and the rotating shaft 2 in the up-down direction, the higher the pressure resistance of the magnetic liquid seal, the less the gap between the third auxiliary sealing ring 22 and the rotating shaft 2 in the up-down direction, the higher the pressure resistance of the magnetic liquid seal, and the less the gap between the fourth auxiliary sealing ring 23 and the rotating shaft 2 in the up-down direction, the higher the pressure resistance of the magnetic liquid seal.

In some embodiments, the capillary magnetic-liquid sealing device further includes a first bearing 15 and a second bearing 16, the first bearing 15 and the second bearing 16 are provided in the housing 1 and fitted over the rotating shaft 2, outer circumferences of the first bearing 15 and the second bearing 16 are in contact with the inner wall of the housing 1, the first magnetically nonconductive capillary block 6 is located between the first bearing 15 and the first pole shoe 3, and the second magnetically nonconductive capillary block 7 is located between the second bearing 16 and the second pole shoe 4.

As shown in FIGS. 1 and 3, the first bearing 15, the first magnetically nonconductive capillary block 6, the first pole shoe 3, the permanent magnet 5, the second pole shoe 4, the second magnetically nonconductive capillary block 7, and the second bearing 16 are sequentially fitted over the rotating shaft 2, and the first magnetically nonconductive capillary block 6, the first pole shoe 3, the permanent magnet 5, the second pole shoe 4, and the second magnetically nonconductive capillary block 7 are all located between the first bearing 15 and the second bearing 16.

In some embodiments, the capillary magnetic-liquid sealing device further includes a first magnetic isolation ring 17 and a second magnetic isolation ring 18 which are provided in the housing 1, the first magnetic isolation ring 17 is fitted over the rotating shaft 2 and located between the first bearing 15 and the first pole shoe 3, an outer peripheral surface of the first magnetic isolation ring 17 is in contact with an inner side surface of the housing 1, and an inner peripheral surface of the first magnetic isolation ring 17 is in contact with an outer peripheral surface of the first magnetically nonconductive capillary block 6.

The second magnetic isolation ring 18 is fitted over the rotating shaft 2 and located between the second bearing 16 and the second pole shoe 4, an outer peripheral surface of the second magnetic isolation ring 18 is in contact with the inner side surface of the housing 1, and an inner peripheral surface of the second magnetic isolation ring 18 is in contact with an outer peripheral surface of the second magnetically nonconductive capillary block 7.

In some embodiments, a groove is formed at an outer peripheral surface of the first pole shoe 3, and a groove is formed at an outer peripheral surface of the second pole shoe 4. The capillary magnetic-liquid sealing device further includes a first sealing ring 19 and a second sealing ring 20, the first sealing ring 19 is provided in the groove at the outer peripheral surface of the first pole shoe 3, and the second sealing ring 20 is provided in the groove at the outer peripheral surface of the second pole shoe 4. In the embodiment of the present application, the arrangement of the first sealing ring 19 and the second sealing ring 20 may prevent the magnetic liquid from being leaked between the outer peripheral surface of the pole shoe and the inner wall surface of the housing 1, thereby improving a sealing performance of the magnetic liquid.

A capillary magnetic-liquid sealing device of some specific examples according to the present disclosure is described below with reference to FIGS. 1 to 4.

The capillary magnetic-liquid sealing device according to the embodiment of the present disclosure includes a housing 1, a rotating shaft 2, a first bearing 15, a second bearing 16, a first pole shoe 3, a second pole shoe 4, a first sealing ring 19, a second sealing ring 20, a permanent magnet 5, a first magnetically nonconductive capillary block 6, a second magnetically nonconductive capillary block 7, a third magnetically nonconductive capillary block 10, a first auxiliary sealing ring 13, a second auxiliary sealing ring 14, a third auxiliary sealing ring 22 and a fourth auxiliary sealing ring 23.

The housing 1 has a shaft chamber 101 therein. An end cover 21 is provided at a right end of the housing 1, a right end of the rotating shaft 2 penetrates through the end cover 21, the end cover 21 is connected with the housing 1 through a bolt, and the end cover 21 is configured to seal the shaft chamber 101.

The rotating shaft 2 is rotatably provided in the shaft chamber 101, and the first bearing 15 and the second bearing 16 are provided in the housing 1 and fitted over the rotating shaft 2.

The first pole shoe 3 and the second pole shoe 4 are fitted over the rotating shaft 2, and arranged at intervals in a left-right direction, a first sealing gap is formed between the first pole shoe 3 and the rotating shaft 2 in an up-down direction, and a second sealing gap is formed between the second pole shoe 4 and the rotating shaft 2 in the up-down direction.

A groove is formed at an outer peripheral surface of the first pole shoe 3, a groove is formed at an outer peripheral surface of the second pole shoe 4, the first sealing ring 19 is provided in the groove at the outer peripheral surface of the first pole shoe 3, and the second sealing ring 20 is provided in the groove at the outer peripheral surface of the second pole shoe 4.

The permanent magnet 5 is fitted over the rotating shaft 2, and located between the first pole shoe 3 and the second pole shoe 4. An outer peripheral surface of the permanent magnet 5 contacts an inner wall surface of the housing 1, and an inner peripheral surface of the permanent magnet 5 and an outer peripheral surface of the rotating shaft 2 are arranged at intervals in a radial direction of the rotating shaft 2.

The first magnetically nonconductive capillary block 6 and the second magnetically nonconductive capillary block 7 are fitted over the rotating shaft 2, and arranged at intervals in an axial direction of the rotating shaft 2; a position of the first magnetically nonconductive capillary block 6 at the rotating shaft 2 is located on a left side of the first pole shoe 3, a first capillary cavity 8 is formed among a right end surface of the first magnetically nonconductive capillary block 6, a left end surface of the first pole shoe 3 and the outer peripheral surface of the rotating shaft 2, and configured to collect magnetic liquid swung out of the first sealing gap, and may also store some magnetic liquid in advance, the first sealing gap is in communication with the first capillary cavity 8, and the magnetic liquid in the first capillary cavity 8 enters the first sealing gap to seal a sealing medium; a position of the second magnetically nonconductive capillary block 7 at the rotating shaft 2 is located on a right side of the second pole shoe 4, a second capillary cavity 9 is formed among a left end surface of the second magnetically nonconductive capillary block 7, a right end surface of the second pole shoe 4 and the outer peripheral surface of the rotating shaft 2, and configured to collect the magnetic liquid swung out of the first sealing gap, and may also store some magnetic liquid in advance, the second sealing gap is in communication with the second capillary cavity 9, and the magnetic liquid in the second capillary cavity 9 enters the second sealing gap to seal the sealing medium.

The third magnetically nonconductive capillary block 10 is fitted over the rotating shaft 2 and located between the first pole shoe 3 and the second pole shoe 4, and an outer peripheral surface of the third magnetically nonconductive capillary block 10 is in contact with the inner peripheral surface of the permanent magnet 5; a third capillary cavity 11 is formed among a left end surface of the third magnetically nonconductive capillary block 10, a right end surface of the first pole shoe 3 and the outer peripheral surface of the rotating shaft 2, and configured to collect the magnetic liquid swung out of the first sealing gap, and may also store some magnetic liquid in advance, the first sealing gap is in communication with the third capillary cavity 11, and the magnetic liquid in the third capillary cavity 11 enters the first sealing gap to seal the sealing medium; a fourth capillary cavity 12 is formed among a right end surface of the third magnetically nonconductive capillary block 10, a left end surface of the second pole shoe 4 and the outer peripheral surface of the rotating shaft 2, and configured to collect the magnetic liquid swung out of the second sealing gap, and may also store some magnetic liquid in advance, the second sealing gap is in communication with the fourth capillary cavity, and the magnetic liquid in the fourth capillary cavity enters the second sealing gap to seal the sealing medium. The first capillary cavity 8, the second capillary cavity 9, the third capillary cavity 11 and the fourth capillary cavity 12 have consistent sizes and shapes.

The first magnetically nonconductive capillary block 6 includes a first base ring 601 and a first protruding ring 602 which are integrally formed, a distance between a right end surface of the first protruding ring 602 and the left end surface of the first pole shoe 3 in the left-right direction gradually decreases from outside to inside in the up-down direction, and the right end surface of the first protruding ring 602 is configured as an inclined plane which is inclined from outside to inside in the up-down direction.

The second magnetically nonconductive capillary block 7 includes a second base ring 701 and a second protruding ring 702 which are integrally formed, a distance between a left end surface of the second protruding ring 702 and the right end surface of the second pole shoe 4 in the left-right direction gradually decreases from outside to inside in the up-down direction, and the left end surface of the second protruding ring 702 is configured as an inclined plane which is inclined from outside to inside in the up-down direction.

The third magnetically nonconductive capillary block 10 includes a third base ring 1001 and a third protruding ring 1002 which are integrally formed, a distance between a left end surface of the third protruding ring 1002 and the right end surface of the first pole shoe 3 in the left-right direction gradually decreases from outside to inside in the up-down direction, and the left end surface of the third protruding ring 1002 is configured as an inclined plane which is inclined from outside to inside in the up-down direction; a distance between a right end surface of the third protruding ring 1002 and the left end surface of the second pole shoe 4 in the left-right direction gradually decreases from outside to inside in the up-down direction, and the right end surface of the third protruding ring 1002 is configured as an inclined plane which is inclined from outside to inside in the up-down direction.

The first auxiliary sealing ring 13 is fitted over the rotating shaft 2, fixed between the first magnetically nonconductive capillary block 6 and the rotating shaft 2, and configured to seal the first pole shoe 3 and the rotating shaft 2; the second auxiliary sealing ring 14 is fitted over the rotating shaft 2, fixed between the second magnetically nonconductive capillary block 7 and the rotating shaft 2, and configured to seal the second pole shoe 4 and the rotating shaft 2; the third auxiliary sealing ring 22 is fitted over the rotating shaft 2, and fixed between the third magnetically nonconductive capillary block 10 and the rotating shaft 2, the fourth auxiliary sealing ring 23 is fitted over the rotating shaft 2, and fixed between the third magnetically nonconductive capillary block and the rotating shaft, and the third auxiliary sealing ring 22 and the fourth auxiliary sealing ring 23 are arranged at intervals in the axial direction of the rotating shaft and symmetrically arranged with respect to an axial center line of the third magnetically nonconductive capillary block 10.

An inner peripheral surface of the first auxiliary sealing ring 13 has a plurality of sealing teeth 1301 arranged at intervals in the axial direction of the rotating shaft 2, an inner peripheral surface of the second auxiliary sealing ring 14 has a plurality of sealing teeth 1401 arranged at intervals in the axial direction of the rotating shaft 2, an inner peripheral surface of the third auxiliary sealing ring 22 has a plurality of sealing teeth 2201 arranged at intervals in the axial direction of the rotating shaft 2, and an inner peripheral surface of the fourth auxiliary sealing ring 23 has a plurality of sealing teeth 2301 arranged at intervals in the axial direction of the rotating shaft 2.

The capillary magnetic-liquid sealing device further includes a first magnetic isolation ring 17 and a second magnetic isolation ring 18 which are provided in the housing 1, the first magnetic isolation ring 17 is fitted over the rotating shaft 2 and located between the first bearing 15 and the first pole shoe 3, an outer peripheral surface of the first magnetic isolation ring 17 is in contact with an inner side surface of the housing 1, and an inner peripheral surface of the first magnetic isolation ring 17 is in contact with an outer peripheral surface of the first magnetically nonconductive capillary block 6.

The second magnetic isolation ring 18 is fitted over the rotating shaft 2 and located between the second bearing 16 and the second pole shoe 4, an outer peripheral surface of the second magnetic isolation ring 18 is in contact with the inner side surface of the housing 1, and an inner peripheral surface of the second magnetic isolation ring 18 is in contact with an outer peripheral surface of the second magnetically nonconductive capillary block 7.

An operation principle of the capillary magnetic-liquid sealing device according to the embodiment of the present disclosure is described below with reference to FIGS. 1 to 4.

In the mounting process of the capillary magnetic-liquid sealing device, the magnetic liquid is stored in the first capillary cavity 8, the second capillary cavity 9, the third capillary cavity 11 and the fourth capillary cavity 12; since the first magnetically nonconductive capillary block 6 and the first pole shoe 3 have a small gap at a part of the first capillary cavity 8 close to the rotating shaft 2 and a large gap at a part of the first capillary cavity 8 apart from the rotating shaft 2, the magnetic liquid in the first capillary cavity 8 is subjected to a capillary force pointing to the axial direction of the rotating shaft 2, and pushed into the first sealing gap under the action of the capillary force, thereby recovering the magnetic liquid and reducing the leakage of the magnetic liquid. Similarly, the magnetic liquid in the second capillary cavity 9, the third capillary cavity 11 and the fourth capillary cavity 12 is sucked in the first sealing gap and the second sealing gap under the action of the capillary force respectively. During operation, even if the rotating shaft 2 rotates at a high speed, part of the magnetic liquid is swung out of the first sealing gap or the second sealing gap, the magnetic liquid in the first sealing gap is swung into the first capillary cavity 8, the second capillary cavity 9, the third capillary cavity 11 and the fourth capillary cavity 12 under the action of a centrifugal force, and the magnetic liquid in the first capillary cavity 8, the second capillary cavity 9, the third capillary cavity 11 and the fourth capillary cavity 12 is still pushed into the first sealing gap and the second sealing gap again under the action of the capillary force, thereby recovering the magnetic liquid and reducing the leakage of the magnetic liquid.

In descriptions of the present disclosure, it should be understood that, directions or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" etc. are based on orientations or positional relationships shown in the accompanying drawings, and they are used only for describing the present disclosure and for description simplicity, but do not indicate or imply that an indicated device or element must have a specific orientation or be constructed and operated in a specific orientation. Therefore, it cannot be understood as a limitation on the present disclosure.

In addition, the terms such as "first" and "second" are used herein for purposes of description and are not intended to indicate or imply relative importance or significance or to imply the number of indicated technical features. Thus, the feature associated with "first" and "second" may include at least one of this feature explicitly or implicitly. In the description of the present disclosure, "a plurality of" means at least two, for example, two, three, or the like, unless specifically limited otherwise.

In the present disclosure, unless specified or limited otherwise, the terms "mounted", "connected", "coupled", and "fixed" and the like are used broadly, and may be, for example, fixed connections, detachable connections, or integral connections; may also be mechanical or electrical connections or communication with each other; may also be direct connections or indirect connections via intervening structures; may also be communication or an interaction relationship of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms "an embodiment", "some embodiments", "example", "specific example" or "some examples" means that a particular feature, structure, material, or characteristic described in connection with the embodiment or example is included in at least one embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples. Furthermore, those skilled in the art may combine different embodiments or examples and features in different embodiments or examples described in the specification, without mutual contradictions.

Although embodiments of the present disclosure have been shown and illustrated, it shall be understood that the above-mentioned embodiments are exemplary and not construed as limitations to the present disclosure. Various changes, modifications, alternatives and variants within the scope of the present disclosure may be made by those skilled in the art.

What is claimed is:

1. A capillary magnetic-liquid sealing device, comprising:
a housing having a shaft chamber;
a rotating shaft rotatably arranged in the shaft chamber;
a first pole shoe and a second pole shoe fitted over the rotating shaft and spaced apart from each other in an axial direction of the rotating shaft, a first sealing gap being formed between the first pole shoe and the rotating shaft in a radial direction of the rotating shaft, a second sealing gap being formed between the second pole shoe and the rotating shaft in the radial direction of the rotating shaft, and a magnetic liquid is provided in the first sealing gap and the second sealing gap;

a permanent magnet fitted over the rotating shaft and located between the first pole shoe and the second pole shoe; and a first magnetically nonconductive capillary block and a second magnetically nonconductive capillary block fitted over the rotating shaft and spaced apart from each other in the axial direction of the rotating shaft, the first pole shoe and the second pole shoe being both located between the first magnetically nonconductive capillary block and the second magnetically nonconductive capillary block, wherein a first capillary cavity is formed among the first magnetically nonconductive capillary block, the first pole shoe and the rotating shaft, a second capillary cavity is formed among the second magnetically nonconductive capillary block, the second pole shoe and the rotating shaft, and a magnetic liquid is provided in the first capillary cavity and the second capillary cavity, the first magnetically nonconductive capillary block comprises a first base ring and a first protruding ring extending inwardly from the first base ring; the first protruding ring comprises a first end surface and a second end surface oppositely arranged in the axial direction of the rotating shaft; the second end surface of the first protruding ring is closer to the first pole shoe than the first end surface of the first protruding ring; the first pole shoe comprises a first end surface and a second end surface oppositely arranged in the axial direction of the rotating shaft; and the first end surface of the first pole shoe is closer to the first magnetically nonconductive capillary block than the second end surface of the first pole shoe, a distance between the second end surface of the first protruding ring and the first end surface of the first pole shoe in the axial direction of the rotating shaft gradually decreases from outside to inside in the radial direction of the rotating shaft, the second magnetically nonconductive capillary block comprises a second base ring and a second protruding ring extending inwardly from the second base ring; the second protruding ring comprises a first end surface and a second end surface oppositely arranged in the axial direction of the rotating shaft; the second end surface of the second protruding ring is closer to the second pole shoe than the first end surface of the second protruding ring; the second pole shoe comprises a first end surface and a second end surface oppositely arranged in the axial direction of the rotating shaft; and the second end surface of the second pole shoe is closer to the second magnetically nonconductive capillary block than the first end surface of the second pole shoe, and a distance between the second end surface of the second protruding ring and the second end surface of the second pole shoe in the axial direction of the rotating shaft gradually decreases from outside to inside in the radial direction of the rotating shaft.

2. The capillary magnetic-liquid sealing device according to claim 1, further comprising a third magnetically nonconductive capillary block fitted over the rotating shaft and located between the first pole shoe and the second pole shoe, an outer peripheral surface of the third magnetically nonconductive capillary block being in contact with an inner peripheral surface of the permanent magnet, wherein a third capillary cavity is formed among the third magnetically nonconductive capillary block, the first pole shoe and the rotating shaft, and a fourth capillary cavity is formed among the third magnetically nonconductive capillary block, the second pole shoe and the rotating shaft.

3. The capillary magnetic-liquid sealing device according to claim 2, wherein the third magnetically nonconductive capillary block comprises a third base ring and a third protruding ring; the third protruding ring comprises a first end surface and a second end surface oppositely arranged in the axial direction of the rotating shaft; the first end surface of the third protruding ring is closer to the first pole shoe than the second end surface of the third protruding ring; and the second end surface of the third protruding ring is closer to the second pole shoe than the first end surface of the third protruding ring, and a distance between the first end surface of the third protruding ring and the second end surface of the first pole shoe in the axial direction of the rotating shaft gradually decreases from outside to inside in the radial direction of the rotating shaft, and a distance between the second end surface of the third protruding ring and the first end surface of the second pole shoe in the axial direction of the rotating shaft gradually decreases from outside to inside in the radial direction of the rotating shaft.

4. The capillary magnetic-liquid sealing device according to claim 2, wherein the first sealing gap has a size of 0.1 to 0.3 mm in the radial direction of the rotating shaft, and the second sealing gap has a size of 0.1 to 0.3 mm in the radial direction of the rotating shaft.

5. The capillary magnetic-liquid sealing device according to claim 2, wherein a gap between the first magnetically nonconductive capillary block and the rotating shaft in the radial direction of the rotating shaft is equal to or less than 0.1 mm; a gap between the second magnetically nonconductive capillary block and the rotating shaft in the radial direction of the rotating shaft is equal to or less than 0.1 mm; and a gap between the third magnetically nonconductive capillary block and the rotating shaft in the radial direction of the rotating shaft is equal to or less than 0.1 mm.

6. The capillary magnetic-liquid sealing device according to claim 3, wherein a minimum distance between the second end surface of the first protruding ring and the first end surface of the first pole shoe in the axial direction of the rotating shaft is equal to or less than a size of the first sealing gap in the radial direction of the rotating shaft; a minimum distance between the second end surface of the second protruding ring and the second end surface of the second pole shoe in the axial direction of the rotating shaft is equal to or less than the size of the first sealing gap in the radial direction of the rotating shaft; a minimum distance between the first end surface of the third protruding ring and the second end surface of the first pole shoe in the axial direction of the rotating shaft is equal to or less than the size of the first sealing gap in the radial direction of the rotating shaft; and a minimum distance between the second end surface of the third protruding ring and the first end surface of the second pole shoe in the axial direction of the rotating shaft is equal to or less than the size of the first sealing gap in the radial direction of the rotating shaft.

7. The capillary magnetic-liquid sealing device according to claim 2, further comprising:

a first auxiliary sealing ring fitted over the rotating shaft and fixed between the first magnetically nonconductive capillary block and the rotating shaft;

a second auxiliary sealing ring fitted over the rotating shaft and fixed between the second magnetically nonconductive capillary block and the rotating shaft;

a third auxiliary sealing ring fitted over the rotating shaft and fixed between the third magnetically nonconductive capillary block and the rotating shaft; and a fourth auxiliary sealing ring fitted over the rotating shaft and fixed between the third magnetically nonconductive capillary block and the rotating shaft, wherein the third auxiliary sealing ring and the fourth auxiliary sealing ring are spaced apart from each other in the axial direction of the rotating shaft and arranged symmetrically with respect to an axial center line of the third magnetically nonconductive capillary block.

8. The capillary magnetic-liquid sealing device according to claim 7, wherein an inner peripheral surface of the first auxiliary sealing ring has a plurality of sealing teeth, and the plurality of sealing teeth of the first auxiliary sealing ring are arranged at intervals in the axial direction of the rotating shaft;

an inner peripheral surface of the second auxiliary sealing ring has a plurality of sealing teeth, and the plurality of sealing teeth of the second auxiliary sealing ring are arranged at intervals in the axial direction of the rotating shaft;

an inner peripheral surface of the third auxiliary sealing ring has a plurality of sealing teeth, and the plurality of sealing teeth of the third auxiliary sealing ring are arranged at intervals in the axial direction of the rotating shaft; and an inner peripheral surface of the fourth auxiliary sealing ring has a plurality of sealing teeth, and the plurality of sealing teeth of the fourth auxiliary sealing ring are arranged at intervals in the axial direction of the rotating shaft.

9. The capillary magnetic-liquid sealing device according to claim 8, wherein a gap between the first auxiliary sealing ring and the rotating shaft in the radial direction of the rotating shaft is less than 0.1 mm; a gap between the second auxiliary sealing ring and the rotating shaft in the radial direction of the rotating shaft is less than 0.1 mm; a gap between the third auxiliary sealing ring and the rotating shaft in the radial direction of the rotating shaft is less than 0.1 mm; and a gap between the fourth auxiliary sealing ring and the rotating shaft in the radial direction of the rotating shaft is less than 0.1 mm.

\* \* \* \* \*